US012038180B2

(12) United States Patent
Malcolm

(10) Patent No.: US 12,038,180 B2
(45) Date of Patent: Jul. 16, 2024

(54) STOVETOP SAFETY SYSTEM

(71) Applicant: Ashley L. Malcolm, Orlando, FL (US)

(72) Inventor: Ashley L. Malcolm, Orlando, FL (US)

( * ) Notice: Subject to any disclaimer, the term of this patent is extended or adjusted under 35 U.S.C. 154(b) by 333 days.

(21) Appl. No.: 17/374,220

(22) Filed: Jul. 13, 2021

(65) Prior Publication Data

US 2022/0010964 A1 Jan. 13, 2022

Related U.S. Application Data

(60) Provisional application No. 63/050,961, filed on Jul. 13, 2020.

(51) Int. Cl.
*F24C 3/12* (2006.01)
*A62C 3/00* (2006.01)
(Continued)

(52) U.S. Cl.
CPC .............. *F24C 3/126* (2013.01); *A62C 3/006* (2013.01); *F24C 7/083* (2013.01); *G08B 7/06* (2013.01);
(Continued)

(58) Field of Classification Search
CPC .. G08B 21/0484; G08B 21/18; G08B 21/182; G08B 21/24; G08B 7/06; F24C 7/08; F24C 7/081; F24C 7/082; F24C 7/083; F24C 7/085; F24C 7/087; F24C 7/088; F24C 3/12; F24C 3/122; F24C 3/124; F24C 3/126; H05B 1/0255; H05B 1/0258; H05B 1/0261; H05B 1/0263; H05B 1/0266; H05B 6/062; H05B 6/6464; H05B 6/666; H05B 3/68; H05B 3/683; H05B 3/74; H05B 3/746; H05B 3/76; H05B 2213/03;
(Continued)

(56) References Cited

U.S. PATENT DOCUMENTS 4,775,913 A * 10/1988 Ekblad ...................... F16P 3/12
219/519
5,380,985 A * 1/1995 Graham ................... H05B 3/68
219/446.1
(Continued)

FOREIGN PATENT DOCUMENTS

| | | | |
|---|---|---|---|
| KR | 20130023412 | A | 3/2013 |
| WO | 2012092863 | A1 | 7/2012 |
| WO | 2018188099 | A1 | 10/2018 |

*Primary Examiner* — Hung D Nguyen
(74) *Attorney, Agent, or Firm* — Erica M. Cipparone; Wolter VanDyke Davis PLLC

(57) ABSTRACT

A cooking device safety system includes a stovetop cooking device with a first sensor to detect the presence of an object on or adjacent to a burner; a second sensor to detect a condition of the burner; a transceiver to send a signal from the first and/or the second sensor to a remote device; a microcontroller with a timer; and a signal output device. A method for providing a safe cooking device environment includes detecting a status of a cooking device and detecting the presence of an object on or in the cooking device. When the cooking device has an activated status and an object is detected, the system detects whether a threshold cooking time has been exceeded. If the threshold has been exceeded, the system produces an alert via a signal output device; and/or sends an alert to a remote device; and/or inactivates the cooking device.

15 Claims, 2 Drawing Sheets

(51) Int. Cl.

| | |
|---|---|
| ***F24C 7/08*** | (2006.01) |
| ***G08B 7/06*** | (2006.01) |
| ***G08B 21/18*** | (2006.01) |
| ***H05B 1/02*** | (2006.01) |
| ***H05B 3/74*** | (2006.01) |

(52) U.S. Cl.
CPC ......... *G08B 21/182* (2013.01); *H05B 1/0258* (2013.01); *H05B 3/746* (2013.01); *H05B 2213/05* (2013.01)

(58) Field of Classification Search
CPC ............ H05B 2213/04; H05B 2213/05; H05B 2213/06; H05B 2213/07; A62C 3/006
See application file for complete search history.

(56) References Cited

U.S. PATENT DOCUMENTS

| | | | | |
|---|---|---|---|---|
| 5,717,188 | A * | 2/1998 | Vaillancourt ........ | H05B 1/0263 219/448.12 |
| 5,734,206 | A | 3/1998 | Keizer et al. | |
| 5,854,520 | A * | 12/1998 | Buck .................... | H05B 1/0225 219/490 |
| 6,294,994 | B1 | 9/2001 | Hoellerich | |
| 7,002,109 | B2 | 2/2006 | Klask | |
| 7,816,818 | B2 | 10/2010 | Sellecchia | |
| 7,999,689 | B1 | 8/2011 | Ray | |
| 8,604,935 | B2 | 12/2013 | Shah | |
| 9,928,672 | B2 | 3/2018 | Jablokov | |
| 9,960,589 | B1 | 5/2018 | Gleason | |
| 9,980,604 | B2 | 5/2018 | Stilo et al. | |
| 11,357,080 | B2 * | 6/2022 | Cowan .................... | F24C 3/122 |
| 2002/0113062 | A1 | 8/2002 | Cranford | |
| 2003/0214999 | A1 | 11/2003 | Chapman et al. | |
| 2004/0145466 | A1 | 7/2004 | Anthony | |
| 2005/0109333 | A1 | 5/2005 | Thomas | |
| 2009/0017404 | A1 | 1/2009 | White et al. | |
| 2012/0097662 | A1 | 4/2012 | Ewell, Jr. et al. | |
| 2014/0120219 | A1 | 5/2014 | Ewell, Jr. et al. | |
| 2016/0245531 | A1 | 8/2016 | Ronk et al. | |
| 2016/0281995 | A1 | 9/2016 | Taylor | |
| 2019/0072433 | A1 | 3/2019 | Rose | |

* cited by examiner

STOVETOP SAFETY SYSTEM

CROSS-REFERENCE TO RELATED APPLICATIONS

This application claims the benefit of U.S. Provisional Application No. 63/050,961 filed Jul. 13, 2020 and incorporated herein by reference in its entirety.

BACKGROUND

Stove-related fires are one of the most common causes of household fires. The number of stove-related fires increase as the population of users increases, due to the aging of the population, dementia in older users, Alzheimer's, and generally forgetfulness. Users with mental or physical disabilities are also at risk. Thirty percent of stove-related fires; however, occur in homes where operators are 65 years of age or older. A large portion of cooking related injuries or deaths occur as a result of leaving the stove-top burner on without supervision.

SUMMARY

Embodiments described herein includes systems and methods to prevent accidents involving one of the most dangerous appliances in most households—the stove. As most injuries or deaths result from unattended use of the stove-top, either by way of accident, or forgetfulness, embodiments described herein serve to resolve these issues and provide safety elements and checkpoints in place to prevent these accidents.

In one non-limiting embodiment, there is provided a stovetop safety system including at least one first sensor to detect the presence of an object on or adjacent to a stovetop burner, optionally, at least one second sensor to detect a condition of the stovetop burner, at least one transceiver to send a signal from the at least one first sensor and/or the at least one second sensor to a remote device, a microcontroller comprising a timer; and a signal output device.

In another non-limiting embodiment, a method for providing a safe stovetop system environment is provided including detecting a status of a stovetop burner, and detecting the presence of an object on or near the stovetop burner, wherein when the stovetop burner has an activated status and an object is detected on or near the burner, the system detects whether a threshold cooking time has been exceeded. If the threshold cooking time has been exceeded, the system: 1) produces an alert via a signal output device; 2) sends an alert to a remote device; and/or 3) inactivates the stovetop burner.

In yet another non-limiting embodiment, a method for providing a safe stovetop system environment is provided. The method includes detecting a status of a stovetop burner, detecting no object on the stovetop burner, wherein when the stovetop burner comprises an activated status and no object is detected on the burner, the system detects whether a threshold non-cooking time has been exceeded. If the non-cooking time threshold has been exceeded, the system: 1) produces an alert via a signal output device; 2) sends an alert to a remote device; and/or 3) inactivates the cooking device.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
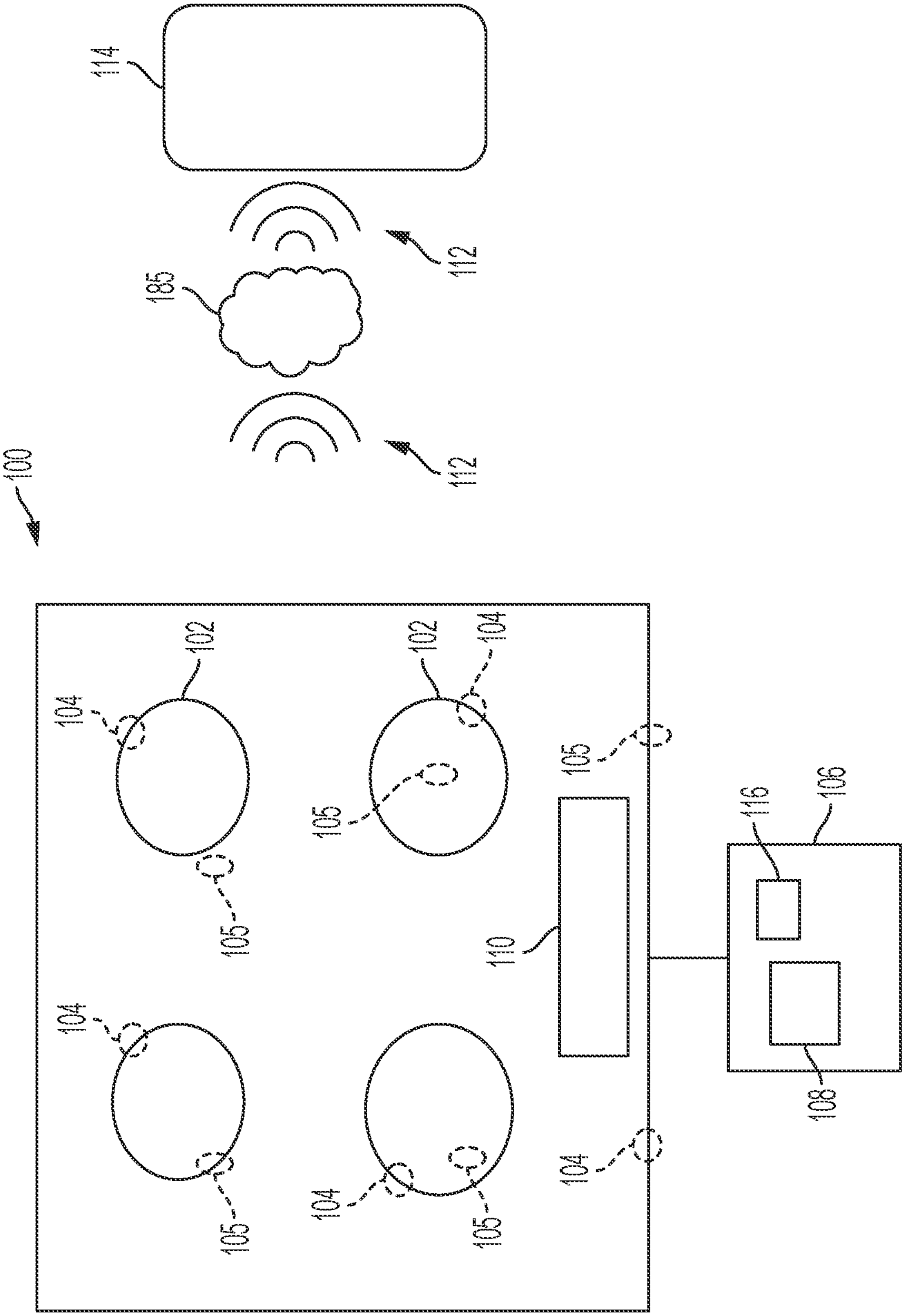
FIG. 1 provides a schematic of a stovetop safety system embodiment.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

The term "cooking device" includes but is not limited to a stovetop, a stove, an oven, a microwave, a toaster, a barbeque grill or other cooking device. Throughout the description any reference to any one type of cooking device may be extrapolated to refer to any type of cooking device mentioned herein.

The terminology used herein is for the purpose of describing particular embodiments only and is not intended to be limiting. As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order, quantity or importance, but rather the terms first, second, etc., are used to distinguish one element from another.

Turning to the drawings, FIG. 1 includes a schematic of a cooking device safety system including a stovetop safety system 100 including one or more burners 102, the one or more burners comprising a heating element. When the one or more burners 102 are activated, heat is produced. The system 100 further includes at least one first sensor 104 to detect the presence of an object on or adjacent to a stovetop burner, and optionally, at least one second sensor 105 to detect a condition of the stovetop burner. The system 100 may further include at least one transceiver 108 to receive a signal from the at least one first sensor 104 and/or the at least one second sensor 105, and to optionally, send a signal to a remote device 114. The system 100 further includes a microcontroller 106 comprising a timer 116, and a signal output device 110. The system 100 may be communicatively connected 112 to a remote device 114 by way of a wired or wireless connection. In FIG. 1, a wireless connection is shown between the system 100 and a remote device 114. The remote device 114 may be any device; however, in FIG. 1, this device is embodied as a cellular device. The remote device 114 may be programmed by software or hardware or other means to control the system 100 via remote inputs on the remote device 114. In the embodiment shown in FIG. 1 a cloud 185 may optionally be used to back up or store information received from the system. The cloud 185 is shown as positioned between the system and the remote device 114; however, this is not meant to be limiting. The system may provide information transfer and storage in a cloud 185 by wired or wireless connection 112 and may communicate information to a remote device 114, or, alternatively, the system may include a cloud 185 for information storage and backup or a remote device 114.

In another non-limiting embodiment, the stovetop safety system may be configured to include one or more sensors 104, 105 to detect the presence of an object on or adjacent to a stovetop burner, or inside an oven, and to detect, optionally, the condition of a stovetop burner and/or an oven. The system 100 may further include at least one transceiver 108 to receive a signal from the one or more sensors 104, 105, and to, optionally, send a signal to a remote device 114. Alternatively, or in addition to sending a signal to a remote device 114 as in the embodiment described above, the system 100 may alert a user via a signal output component 110 associated with the system. For example, the system 100 may sound an alarm through a signal output device 110 comprising a speaker on the system itself. In another embodiment, the signal output component 110 may include a visual indicator, which may flash or change color or turn on as an alarm. The signal output component 110 may provide an output to a user or third party by any means known in the art including, visual, tactile, auditory, gustatory, or by way of a smellant or olfactory output to provide an alert or a communication to a user or third party.

The microcontroller 106 described in embodiments of the system 100 herein may, optionally, communicate with a neural network (Cloud) cloud 185, which may be able to detect a pattern of use of the cooking device and provide a suggestion based on that pattern, or, may detect an error based on that pattern. For example, if a user routinely cooks during the week, but not on the weekend, the neural network will learn this pattern of cooking and may, for example, detect an error should the cooking device be in use on the weekend. In another example, if a user routinely bakes at 350 degrees for an hour, the neural network can learn and store this information, such that if the oven is left on 350 degrees for a prolonged period of time, for example, longer than 2-3 hours, or at 450 degrees for a prolonged period, the system may issue an alert that the use is a non-traditional use for that user. This is another manner in which the system can detect errors and prevent accidents from occurring in the use of the cooking device. These examples are intended to be exemplary only and are not limiting examples of behaviors that may be learned by the neural network component of the system 100.

In some non-limiting embodiments the system embodiments described herein may work in conjunction with a personal digital virtual assistant (VA) such as such as SIRI, Amazon Alexa, Google Assistant, Cortana, or other) to extend functionality and operate the system, including communication between the system and a remote third party or remote third party device to improve and automate functionality of the system.

Figure 2:
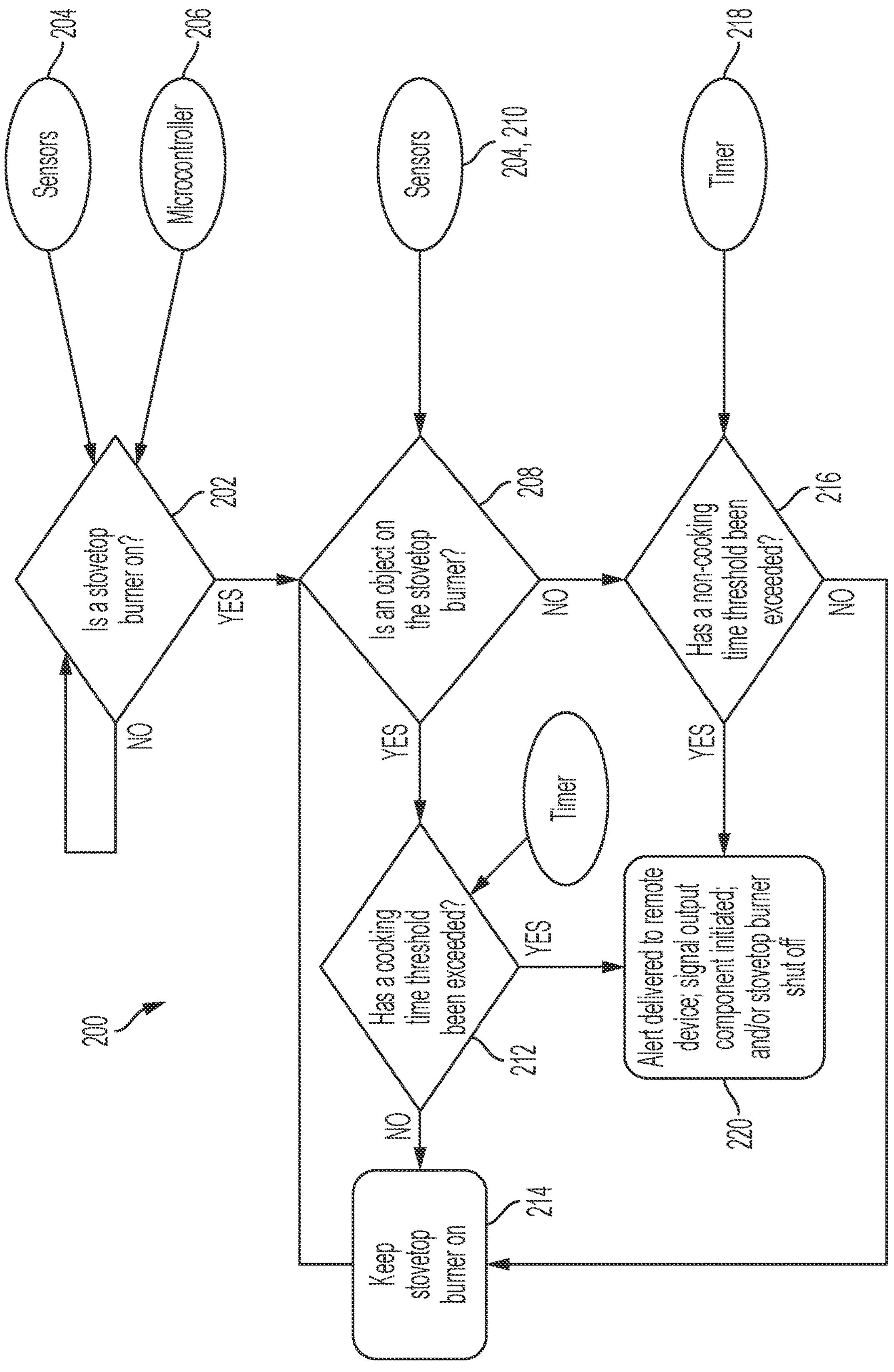
FIG. 2 provides a flowchart demonstrating a method for providing a safe stovetop system environment.

FIG. 2 provides a flowchart of a method 200 for providing a safe stovetop system 100 (or other cooking device) environment or use thereof. The method 200 includes circuitry or a microprocessor executing instructions, including a first determination of whether a stovetop burner is on or activated 202. If the system 100 determines that a stovetop burner is not activated, it returns to step 202 to make the same determination again. Once the determination is made that the stovetop burner is on or activated in step 202, which is based at least in part on sensor 204 input and/or microcontroller 206 input, the system 100 proceeds to step 208 to determine if an object is on or adjacent to the stovetop burner. Should the determination in step 208 be that no object is on or adjacent to the stovetop burner, based at least in part on sensor 204, 210 input, the system 100 proceeds to step 216 to determine whether a pre-set non-cooking time threshold has been exceeded. This determination is made at least in part based on input from a timer 218 as shown in FIG. 2. Should the answer to step 216 be no, the system continues to step 214 and keeps the stovetop burner on or activated, and returns to step 208.

At step 208 if the answer is yes, that an object is on the stovetop burner, the system 100 proceeds to step 212 to detect whether a preset cooking time threshold has been exceeded at step 212. As one may suspect, a cooking time threshold indicates the amount of time required to heat or cook the contents within a pan or pot placed on a stove. In embodiments where the cooking device is an oven, a cooking time threshold may be the amount of time required to bake or broil an item, for example. It is understood that typically a cooking-time threshold would differ from a non-cooking time threshold when an object is not placed on the activated burner. Consequently, based on the time frames provided herein and what is generally known to those skilled in the art, the system would send an alert based on whether the condition of the system includes a cooking time threshold or a non-cooking time threshold. The system will detect whether a cooking time threshold or non-cooking time threshold is appropriate based on sensor input and whether an object is detected on the stove (or in the oven, or otherwise associated with the cooking device as described in other examples herein).

If the system detects that a cooking time threshold has not been exceeded at step 212, the system moves to step 214, and the burner is left on. Should the system detect at step 212 that a cooking time threshold has been exceeded, or at step 216 that a non-cooking time threshold has been exceeded, the system would proceed to step 220, at which time the system 100 would deliver an alert to the user of the system/stovetop device via the signal output device 110, or to a remote device 114, or both, and/or the stovetop burner may be automatically powered off at step 220. Alternatively, or in addition, emergency personnel may be alerted at step 220. In some instances, for example, should the system detect a non-cooking time or cooking time threshold ahs been exceeded, an alert may be delivered to a pre-designated list of emergency contacts. The alert may include an option for the pre-designated contact(s) to confirm whether emergency management (police, ambulance, and/or fireman) should be dispatched or contacted. In at least one embodiment, if no confirmation is received from a pre-designated emergency contact, and/or one cannot be reached, the emergency management may automatically be dispatched to the location of the cooking device, which can be determined as known to those skilled in the art or in the methods described herein.

In various embodiments herein, a first sand/or second sensor is described for detecting conditions required of the system. In one embodiment the sensors described herein may include a contact sensor. A contact sensor may be provided to detect a contact or insufficient contact between one object and another, for example, to detect contact or lack thereof between an object and a stove burner. In one embodiment, an alert may be delivered from the system based on detection from a contact sensor, and optionally, one or more sensors. The contact sensor may be positioned on any portion of the stove; however, in some non-limiting embodiments, the contact sensor may be positioned directly beneath or adjacent to a burner. The contact sensor may communication with other components of the system to alert a user when a contact has or has not been made with an object. Likewise, the contact sensor(s) may be in or around the oven to detect whether an object is placed within an oven.

In another embodiment, the sensor(s) may include one or more proximity sensors to detect an object that is within a range of the sensor. The proximity sensor, like the contact sensor, may be placed on or around the burner(s), or in or around the oven. Therefore, should an object be near the stovetop burner, or in an oven, an alert may be sent to a user.

In a further embodiment, a location sensor may be provided to detect a location of the system. For example, a remote device may monitor multiple systems, and consequently, may require information about a particular location of each system to detect which system requires attention or alerts. This location information for the system may be communicated to the remote device. The location or position of the system may be located by GPS, triangulation, or other methods known in the art. Tracking the location of the system is important in the instance that police, the fire department, an ambulance or other third party may need to be dispatched and sent to the location of the system. The remote device may include, in one non-limiting embodiment, a cellular phone, or a software application on a cellular phone.

In still other embodiments, the sensors described herein may include a temperature sensor, which may be used to detect whether a burner (or a heating element in an oven) is activated or inactivated. A temperature sensor may also be used to detect whether an object has been placed on or adjacent to a burner, or in an oven. Consequently, in at least one non-limiting embodiment, the system may be able to detect and send alerts with only one sensor. In one example that one sensor may be a temperature sensor to detect both an object in contact with a burner (or inside an oven) and to detect whether the burner (or oven) is activated or inactivated, in one non-limiting embodiment. Alerts may be delivered whether contact is sensed on the stove or an object is sensed in the oven or no contact or no object is sensed and when the temperature or other sensor detects the stovetop or oven is on or off.

Other non-limiting types of sensors that may be used in the system embodiments described herein may include visual sensors, visual heat sensors, thermographic or thermal imaging cameras, or light sensors. A visual sensor may include a camera, in a non-limiting embodiment, wherein the camera may identify the presence or absence of an object on or adjacent to a stovetop burner, or inside or adjacent to an oven. A visual sensor may also communicate with the neural network on the type (size, shape, material, color) of objects to learn patterns of heating times and temperatures against the use of those objects.

Other types of sensors that may be used in the system include Lidar, thermal, ultraviolet sensors, infrared sensors, and smoke sensors.

In a non-limiting embodiment, the system may operate without a cooking time or non-cooking time threshold. In one example, a user can control the cooking device from a phone application to turn off or turn down the cooking device temperature. Consequently, when no cooking time/non-cooking time threshold is used, the cooking device may be left on for an extended period of time. Should a user leave the location of the system and cooking device, the user can operate and shut down the cooking device remotely by way of a software application, for example, on the users' phone. By way of the application a user may be able to view, for example, on a stovetop which burners are activated and/or whether the oven was left on, and may also be able to control the temperature and/or turn on/shut off each burner independently of one another or shut off the cooking device entirely.

The system may be built into a cooking device or may be adapted to the cooking device. In at least one embodiment, the system may be a stand-alone system, which may be configured to work with a cooking device, wherein the system described herein may be obtained separate and apart from the cooking device and adapted to work with the cooking device, i.e., applied aftermarket to the stove or oven system to work therewith.

As discussed throughout herein, the system pertains to detecting and controlling a cooking device, wherein the cooking device may include a stove, a stovetop, an oven, a microwave, or a barbeque grill, in non-limiting examples. In all embodiments herein, the system may include, instead, or in addition, control and detection of an oven (or other cooking device) including sensor(s) placed in the oven (or other cooking device) and communication and control via a software application. In every instance where the stovetop burner temperature is mentioned, the oven temperature or microwave control or barbeque grill can be monitored and controlled in a similar manner. Users can also access, control and modify the operation of the cooking device as discussed with respect to the stove or other cooking device herein.

A light or proximity sensor may be used in one or more embodiments to detect whether an object has been placed on or adjacent to a burner or stovetop. The light may project from the surface or from beneath the surface of the stovetop or stovetop burner until the object obstructs the light, consequently indicating that an object has been placed on the stovetop.

Additional sensors of the medicament delivery training device include perpendicularity sensors, orientation sensors, resistive sensors, and tactile sensors, alignment sensors, accelerometers, gyroscopes, and perpendicularity light sensors or any other sensor suitable for detecting one or more of the conditions associated with the system, including but not limited to contact or proximity between a stovetop burner and an object and/or activation or inactivation of the stovetop burner.

In some embodiments, the system includes a microprocessor. The system may also include circuitry, which may include in part, the microprocessor and the signal output component for initiating audio, and visual, outputs, among other electronic components. These components may be operatively coupled by electrical conductors, however, in other embodiments the components may be operatively coupled without being physically connected. For example, in some embodiments, at least a portion of the components included in an electronic circuit system can be inductively coupled. In other embodiments, at least a portion of the components included in an electronic circuit system can be evanescently coupled.

The circuitry of the system may include a flexible printed circuit board to electronically couple with the components contained therein. The circuitry may be disposed in any suitable manner relative to the housing of the stovetop device, or a separate housing including only the system described herein in one non-limiting embodiment. In some embodiments, for example, the circuitry can be integrated with the stove. The circuitry can be contained within a housing separate from the stovetop, configured to be associated with the stovetop for operation, for example, and/or it may be partially or fully assembled concurrently with and/or with the same processes of the stove device. The circuitry may alternatively or in addition be provided on the outer portion of the housing of the stovetop device.

In yet another embodiment, a non-transitory computer-readable medium embedded in a system as described herein is disclosed. The non-transitory computer readable medium stores instructions executable by the microprocessor or another processing device to cause the processing device to output an alert or information by visual or audio means, for example, via the signal output device in response to sensor input.

Some embodiments of the invention relate to a computer storage product with a computer-readable medium having instructions or computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code or code located remotely on the neural network.

Powering on the system, in some embodiments, initiates the system functions; however, the system functions may be automatically initiated during use of the stove device.

A control interface may be associated with the system, either by wired connection or wirelessly connected thereto. The control interface may be provided on the remote device described in embodiments herein.

In some embodiments, the device is associated with a memory storage module which may be either a removable or a non-removable memory storage module. Memory contained in this module may include various languages of audio, updating information for the system, information about data, usage and history of usage of the device, as well as trending results, for example.

The remote device described herein may include, for example, a remote communications network, a computer, a cell phone, a personal digital assistant (PDA) or the like. Such an arrangement can be used, for example, to download replacement processor-readable code from a central network to the memory module or other memory of the system or to provide updates to the system. In some embodiments, the circuitry of the remote device can download or obtain information associated with the system embodiments described herein.

A network interface can be associated with the system embodiments described herein and can be configured to transmit information to and/or receive information from the circuitry of the system to and/or from a central network, such as, for example, an emergency response network. In some embodiments, for example, the system can notify an emergency responder regarding information that has been collected, for example, pertaining to time stamps indicating when the burner was initiated, how long the burner was left activated, how often the system alerts a user, among other information. In other embodiments, as described herein, the system can transmit information to and/or from a third party, such as a physician, an emergency contact and/or the manufacturer of a stovetop device, including information related to malfunctions of the device and/or the system as needed. Such information can include, for example, the dates and times of the alerts delivered, length of time of an activated burner prior to alert or shut off of the burner, or the like. This information may be helpful in securing the safety of the user of the system and stovetop device, as well as reporting errors in device or system operation.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7.

What is claimed is:

1. A cooking device safety system, comprising a stovetop cooking device, comprising:

at least one first sensor to detect the presence of an object on or adjacent to a stovetop burner;

at least one second sensor to detect a condition of the stovetop burner;

wherein when an object is detected on or adjacent to the stovetop burner, and the at least one second sensor detects the burner is activated, a cooking time is detected, and wherein when no object is detected on or adjacent to the stovetop burner, and the at least one second sensor detects the burner is activated, a non-cooking time is detected;

at least one transceiver to send a signal from the at least one first sensor and/or the at least one second sensor to a remote device;

a microcontroller comprising a timer, said timer configured to detect time elapsed when the stovetop burner is activated, said timer comprising a cooking time threshold and a non-cooking time threshold; and a signal output device, wherein when the at least one second sensor detects the condition of the stovetop burner is activated, and wherein a non-cooking time is detected, the system determines whether a non-cooking time threshold has been exceeded, when such non-cooking time threshold has been exceeded, the signal output device is activated and/or the at least one transceiver sends a signal to a remote device; and wherein when the at least one second sensor detects the condition of the stovetop burner is activated, and wherein a cooking time is detected, the system determines whether the cooking time threshold has been exceeded, when such cooking time threshold has been exceeded, the signal output device is activated and/or the at least one transceiver sends a signal to a remote device.

2. The stovetop safety system of claim 1, wherein the system is communicatively connected to the remote device via wired or wireless communication.

3. The cooking device safety system of claim 2, wherein the remote device comprises a cellular device.

4. The cooking device safety system of claim 2, wherein the remote device is communicatively connected to the system to monitor and provide input to the system, comprising inactivating the burner(s) and/or, activating the signal output device.

5. The cooking device safety system of claim 1, wherein the transceiver receives a signal from the at least one first and second sensor, and sends said signal(s) to the microcontroller.

6. The cooking device safety system of claim 1, wherein the non-cooking time threshold comprises a time between 0-20 minutes.

7. The cooking device safety system of claim 1, wherein the non-cooking time threshold comprises a time between 5-10 minutes.

8. The cooking device safety system of claim 1 wherein the cooking time threshold and non-cooking time threshold may be manually set in the system.

9. The cooking device safety system of claim 1, wherein the microcontroller receives information from the at least one first and/or second sensor, and/or the timer.

10. The cooking device safety system of claim 1, wherein when the stovetop burner is in an activated condition, and the at least one first sensor detects the presence of an object on the stovetop burner, and wherein the cooking time threshold has been exceeded, an alert is transmitted to a remote device, and/or a signal output component is activated, and/or the stovetop burner is automatically inactivated by the microcontroller.

11. The cooking device safety system of claim 1, wherein when the stovetop burner is in an activated condition, and the at least one first sensor detects no object in contact with the stovetop burner, and wherein the non-cooking time threshold has been exceeded, an alert is transmitted to a remote device, and/or a signal output component is activated, and/or the stovetop burner is automatically inactivated by the microcontroller.

12. The cooking device safety system of claim 1, wherein the signal output device comprises a speaker, a light, a display, a scent-emitting component, and/or a vibratory component, said signal output device to provide an alert to a user.

13. A method for providing a safe cooking device environment, wherein said cooking device comprises a stovetop device, said method comprises:

detecting a status of a stovetop burner;

detecting an object on the stovetop burner;

wherein when the stovetop burner comprises an activated status and an object is detected on the burner, the system detects whether a threshold cooking time has been exceeded; and/or wherein when the stovetop burner comprises an activated status and no object is detected on the burner, the system detects whether a threshold non-cooking time has been exceeded;

wherein if the cooking time threshold or the non-cooking time threshold has been exceeded, the system:

produces an alert via a signal output device;

sends an alert to a remote device; and/or inactivates the stovetop burner.

14. A cooking device safety system, comprising a stovetop cooking device, comprising:

at least one first sensor to detect the presence of an object on or adjacent to a stovetop burner;

at least one second sensor to detect a condition of the stovetop burner;

wherein when an object is detected on or adjacent to the stovetop burner, and the at least one second sensor detects the burner is activated, a cooking time is detected, and wherein when no object is detected on or adjacent to the stovetop burner, and the at least one second sensor detects the burner is activated, a non-cooking time is detected;

at least one transceiver to send a signal from the at least one first sensor and/or the at least one second sensor to a remote device;

a microcontroller comprising a timer, said timer configured to detect time elapsed when the stovetop burner is activated, said timer comprising a cooking time threshold and a non-cooking time threshold, wherein said microcontroller further communicates with a neural network for detecting patterns of use of the cooking device; and a signal output device.

15. The cooking device safety system of claim 14, wherein based on the patterns detected via the neural network, use of the device in conflict with the detected patterns produces an alert via the signal output component.

* * * * *